United States Patent [19]
Comfort

[11] 3,735,885
[45] May 29, 1973

[54] SIDELOADER LIFT TRUCK WITH POWERED DECK AND CARRIAGE ROLLERS

[75] Inventor: Samuel T. Comfort, Homewood, Ill.

[73] Assignee: Allis Chalmers Corporation, Milwaukee, Wis.

[22] Filed: July 28, 1971

[21] Appl. No.: 166,910

[52] U.S. Cl. .................. 214/520, 214/75 G, 214/84
[51] Int. Cl. ............................................. B60p 1/00
[58] Field of Search ............... 214/75 R, 75 T, 75 G, 214/730, 84, 520

[56] References Cited

UNITED STATES PATENTS

| | | |
|---|---|---|
| 3,219,210 | 11/1965 | Loef ........................... 214/75 R |
| 3,575,309 | 4/1971 | Peterson ....................... 214/75 T |
| 3,279,631 | 10/1966 | McCartney ...................... 214/84 |
| 3,435,969 | 4/1969 | McCartney et al. ............... 214/84 |
| 3,447,665 | 6/1969 | Egeland et al. .................. 214/84 |
| 3,292,804 | 12/1966 | Veneman ....................... 214/624 |

Primary Examiner—Gerald M. Forlenza
Assistant Examiner—Lawrence J. Oresky
Attorney—Charles L. Schwab, Robert B. Benson, Kenneth C. McKinett

[57] ABSTRACT

Reversible powered rollers are provided on the fore and aft decks of a sideloader lift truck to move cargo containers longitudinally and a carriage platform is provided with reversible powered rollers to selectively move cargo containers longitudinally or laterally.

10 Claims, 5 Drawing Figures

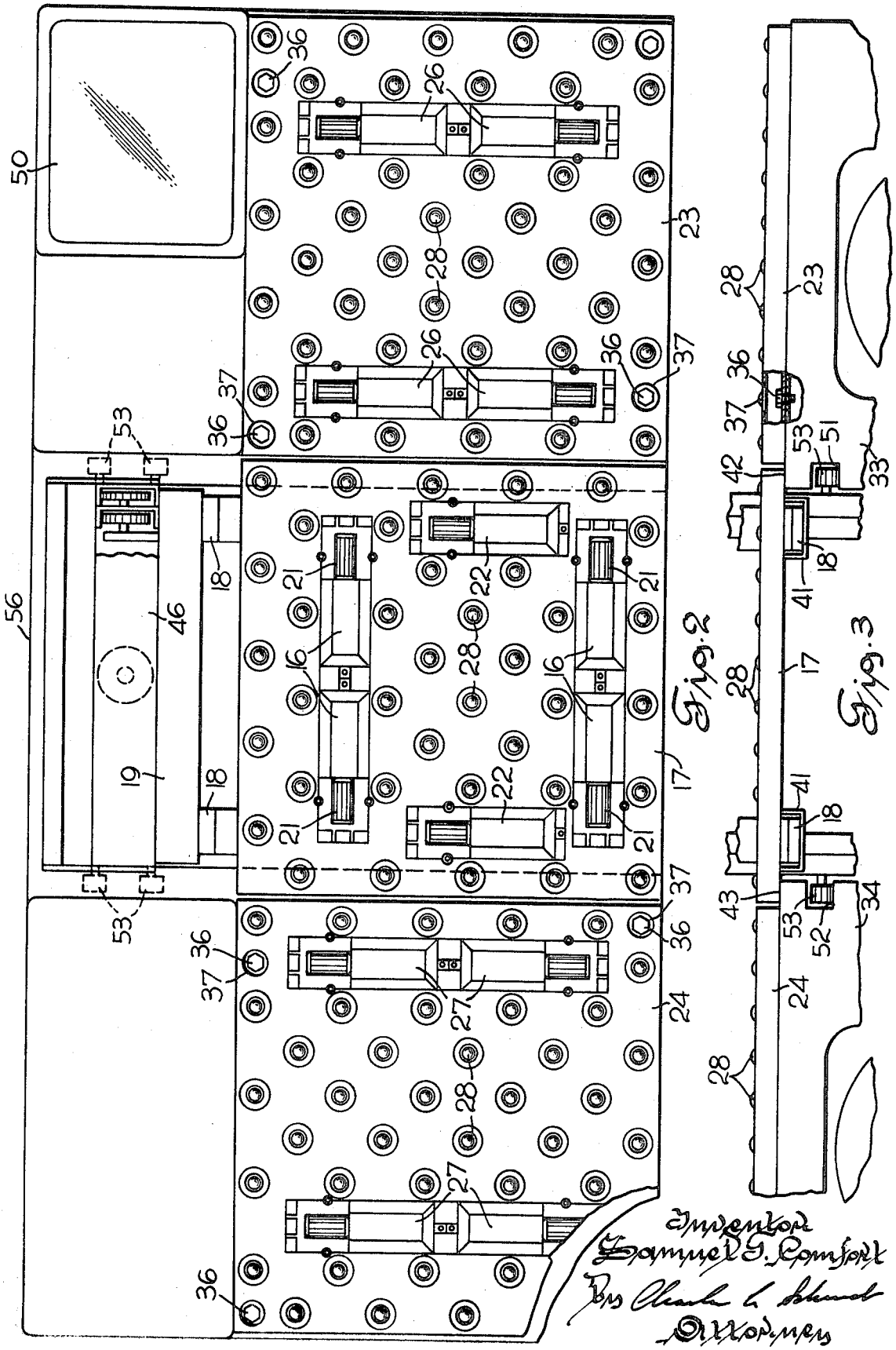

SIDELOADER LIFT TRUCK WITH POWERED DECK AND CARRIAGE ROLLERS

BACKGROUND OF THE INVENTION

Heretofore, the material handling industry has taken substantial strides toward use of cargo containers to move merchandise. Considerable movement of cargo containers has been achieved by train, truck and ship; and in more recent times, effort has been made to move cargo containers by aircraft. At the present time several types of material handling vehicles are being utilized to load and unload cargo containers transported by aircraft. It is, of course, expensive to provide a plurality of material handling vehicles to handle air freighted cargo containers.

SUMMARY OF THE INVENTION

In the present invention, a sideloader lift truck has been modified by attaching a platform to the carriage of the lift truck mast which has two sets of reversibly powered rollers for selectively moving the cargo container either laterally into and out of an aircraft or longitudinally onto and off the fore and aft decks of the sideloader truck. The fore and aft decks of the sideloader truck are provided with reversible powered rollers which are capable of moving the cargo containers in either longitudinal direction so as to assist in moving cargo containers from their deck onto the platform mounted on the carriage and vice versa.

BRIEF DESCRIPTION OF THE DRAWINGS

FIG. 2 is a top view of the sideloader lift truck shown in FIG. 1;

FIG. 3 is a side view of the lift truck shown in FIGS. 1 and 2 with parts omitted;

DETAILED DESCRIPTION OF THE INVENTION

Figure 1:
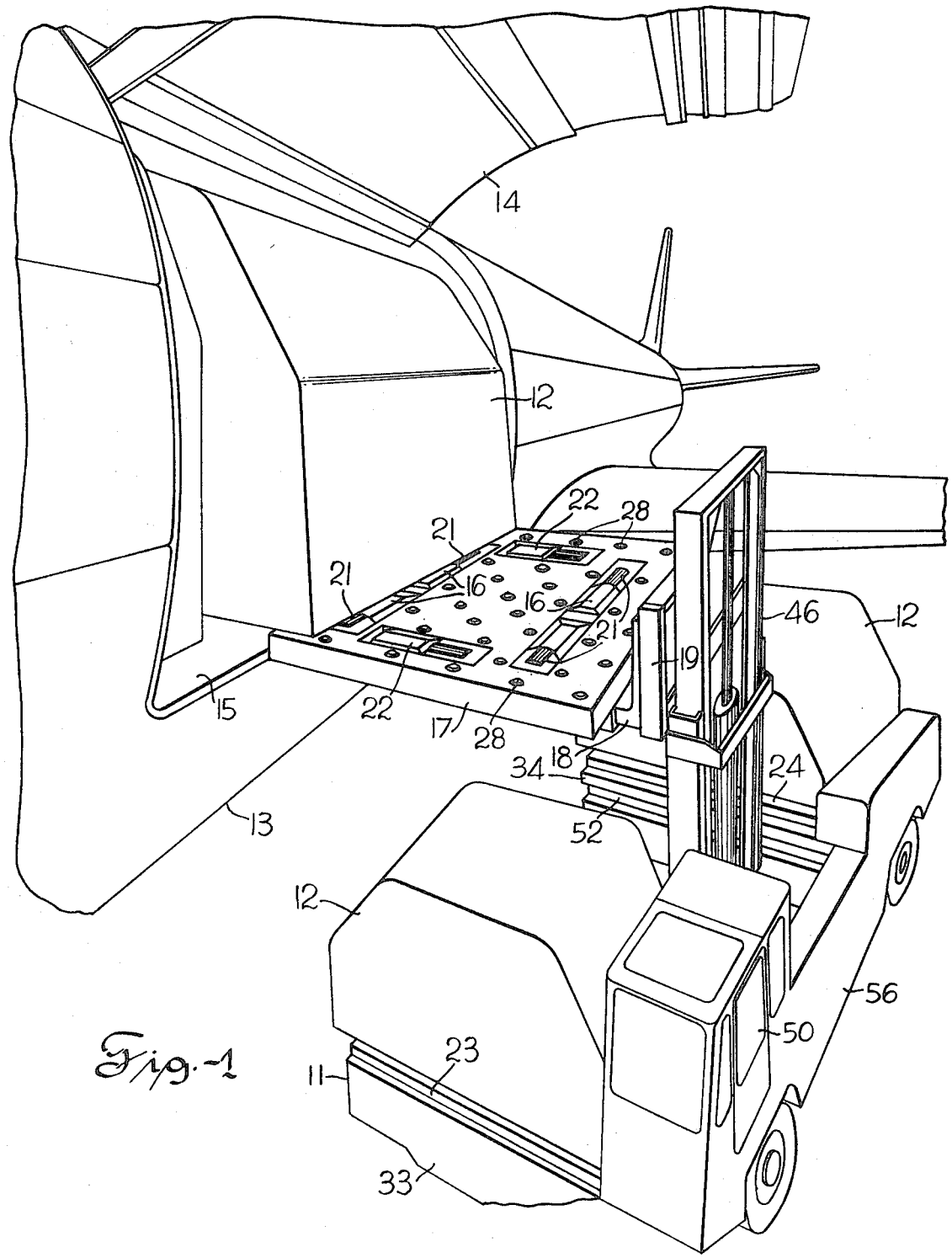
FIG. 1 is a pictorial view of a sideloader lift truck incorporating the present invention and a cargo aircraft engaging in a cargo container transfer operation.

Referring to FIG. 1, the sideloader type lift truck 11 is shown loading a cargo container 12 into a cargo-type aircraft 13. The aircraft 13 is of the type having a hinged side door 14 which opens to permit loading and unloading of cargo containers. The floor 15 of the aircraft is provided with suitable roller means, not shown, for moving the cargo containers 12 to the desired position within the aircraft.

In FIG. 1, the cargo container 12 is being moved laterally off the truck 11 by powered roller means in the form of roller assemblies 16 installed in the platform 17 carried by the forks 18 of the carriage 19. The roller means are electrically powered reversible rollers, such as Model No. 20,627, Varo Roller, produced and sold by Varo, Inc., Santa Barbara, California. This type of powered roller assembly has a roller 21 which elevates upon the roller assembly 16 being energized to cause the roller 21 to rotate in either direction. The platform 17 is also provided with powered roller means in the form of roller assemblies 22 which are identical to the roller assemblies 16; however, roller assemblies 22 are disposed to move a cargo container resting on the platform 17 in either longitudinal direction of the truck. Thus, the roller assemblies 22 are operable to move cargo containers 12 from the platform 17 to the decks 23, 24 and vice versa.

Referring also to FIG. 2, the decks 23, 24 are provided with reversible powered roller means in the form of roller assemblies 26, 27, such as Varo Rollers, Model No. 20,686, produced and sold by Varo, Inc., Santa Barbara, California. The rollers of roller assemblies 26, 27 are of fixed elevation. The platform 17 and decks 23, 24 also include universal type rollers 28 to provide the required support for the cargo container 12.

The platform 17 and upper portions or decks 23, 24 are attachments to a sideloader truck. The decks 23, 24 being releasably secured to the front and rear sections 33, 34 of the lift truck by cap screws 36 which are accessible through openings 37 in the top of the decks 23, 24. As shown in FIGS. 1 and 3, the forks 18 extend through stirrups 41 secured as by welding to the underside of the platform 17. The decks 23, 24 are somewhat shorter in longitudinal dimension than the longitudinal dimension of the front and rear sections 33, 34; thus, exposing a shoulder portion 42, 43 for supporting the platform 17 when the carriage 19, supported on a mast 46, is lowered to a predetermined elevation such as illustrated in FIG. 3. It will be noticed in FIG. 3 that the top of the detachable decks 23, 24 and the top of the platform 17 are coplanar; thus, facilitating longitudinal movement of the cargo containers 12 to and from the decks and platform.

In the embodiment of the invention illustrated in FIGS. 1 through 3, three cargo containers 12 can be loaded from storage onto the sideloader truck, transported to the aircraft and then loaded into the aircraft by employing the powered rollers in the decks and carriage platform. Thus, a single sideloader lift truck can be used for transferring cargo containers from their place of storage, or other repose, to the aircraft and then transfer them to the aircraft. The sideloader incorporating the present invention is, of course, capable of handling the reverse operation. The two sets of roller assemblies 16, 22 on the platform 17 have rollers which automatically elevate when the assemblies are subjected to driving power. When not energized, the rollers retract away from the cargo container so as not to interfere with movement of the container by the other set of powered rollers.

It will be appreciated that a separate control system, not shown, is used for each of the four sets of powered roller assemblies. Specifically, one control system is used for the rollers 26 on deck 23; a second control system is used for the rollers 27 on deck 24; a third control system is provided for rollers 16 on platform 17; and a fourth control system is provided for the power roller means 22 on the platform 17. The control systems can be similar or identical in construction and operable from the operator's station 50 or alternatively from a position at the side of the truck.

As is customary in sideloader type lift trucks, the mast 46 is supported in a pair of recessed tracks 51, 52 in the front and rear units 33, 34 by rollers 53. This permits the mast 46 to be moved laterally by means, not shown, in the well formed by the front and rear units 33, 34 and interconnecting frame portion 56.

Figure 4:
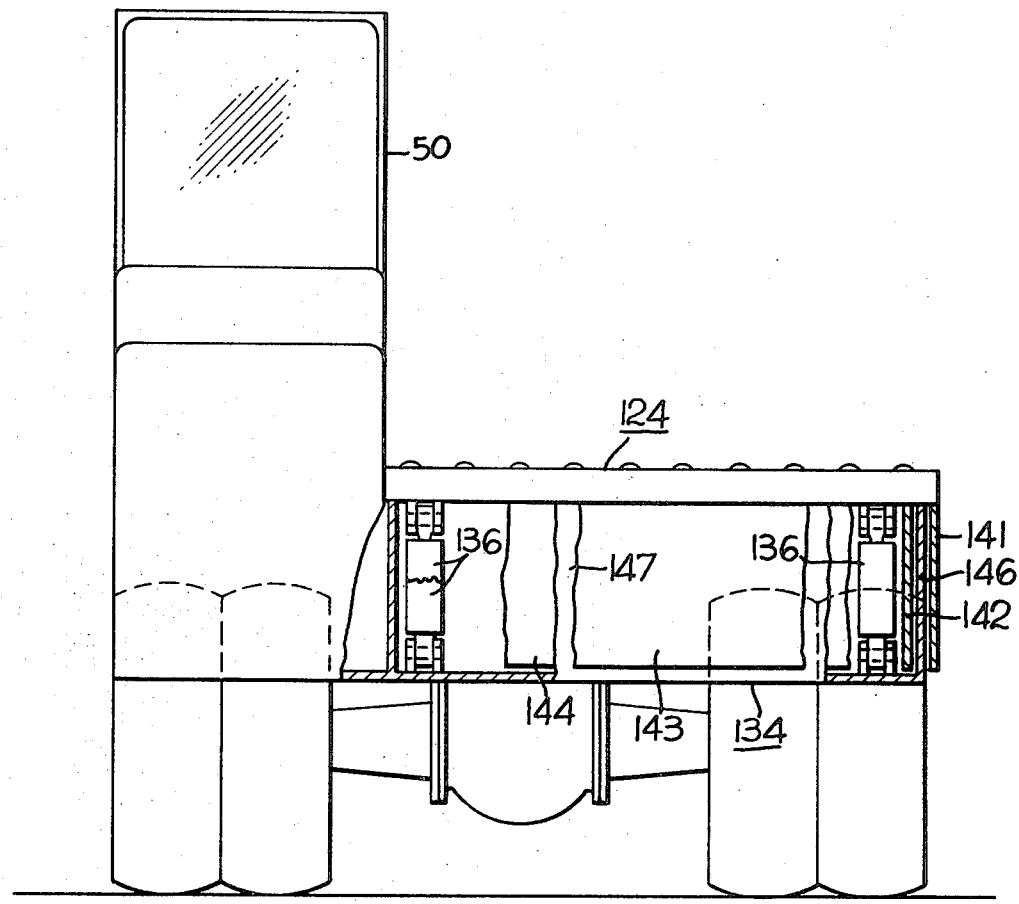
FIG. 4 is an end view of a sideloader lift truck showing the second embodiment of the present invention.
Figure 5:
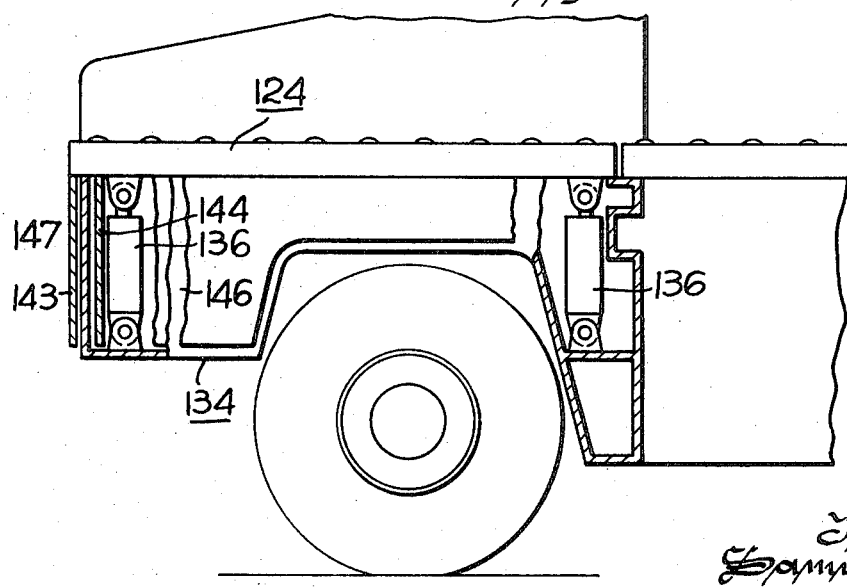
FIG. 5 is a partial side view of the lift truck shown in FIG. 4.

Referring to FIGS. 4 and 5, a second embodiment of the present invention is illustrated wherein the upper portion of each of the decks is elevatable. As illustrated, the deck 124 of rear unit 134 is raised and lowered by four jacks 136. The upper part of the deck 134 has depending therefrom skirtlike plates 141, 142, 143, 144 which are reciprocably guided on the side walls 146, 147 of the rear unit 134. Elevatable decks lend versatility to the sideloader truck facilitating use with a variety of cargo container storage situations.

The embodiments of the invention in which an exclusive property or privilege is claimed are defined as follows:

1. In a sideloader lift truck of the type having a mast with lift carriage and load carrying decks on fore and aft sections separated by a well opening at one side thereof in which the mast is disposed for lateral reciprocable movement, the improvement comprising:
   roller means on said decks, respectively, for facilitating movement of containers resting thereon longitudinally of said truck, and
   a load handling platform on said carriage including first reversible powered roller means for moving a cargo container resting thereon laterally of said truck and second reversible powered roller means for moving a cargo container resting thereon longitudinally of said truck.

2. The invention of claim 1 wherein said roller means on said decks are reversible powered roller means.

3. The invention of claim 1 wherein each of said reversible powered roller means includes a roller which is raised so as to contact said cargo container resting on said platform whenever said powered roller means are operated.

4. The invention of claim 3 wherein said roller means on said decks include reversible, selectively powered rollers operable to move cargo containers resting on said decks longitudinally fore and aft.

5. The invention of claim 4 wherein said decks are adjustable in elevation.

6. The invention of claim 1 wherein said platform rests on said fore and aft sections when said carriage is at a predetermined elevation and when so resting the tops of said platform and decks are substantially coplanar.

7. The invention of claim 1 wherein said decks are detachable.

8. The invention of claim 7 wherein said first mentioned roller means are selectively powered in opposite directions so as to move cargo onto and from the respective decks.

9. The invention of claim 8 wherein said platform is an attachment to said carriage.

10. The invention of claim 9 wherein said platform rests on said fore and aft sections when said carriage is at a predetermined elevation and when so resting the tops of said platform and decks are substantially coplanar.

* * * * *